United States Patent Office.

JAMES T. LEETE, OF NEW YORK, N. Y.

Letters Patent No. 64,232, dated April 30, 1867.

IMPROVED BURNING FLUID.

The Schedule referred to in these Letters Patent and making part of the same.

TO ALL WHOM IT MAY CONCERN:

Be it known that I, JAMES T. LEETE, of New York city, State of New York, have invented a new and improved Burning Fluid; and I do hereby declare that the following is a full and exact description thereof.

To enable others skilled in the arts I will proceed to describe the component parts of my burning fluid, so that they can make it.

I take forty gallons of benzine or naphtha, at 65° gravity, and charge the same fully with carbonic acid gas. This is done to reduce to a great extent the inflammability of the naphtha. I then let it stand for about twelve (12) hours. I then mix with it four pounds of amber root, one pound of glycerine, one-quarter pound gum camphor, one pound of liquid ammonia, one ounce of ambergris. I then let the fluid stand for about forty-eight hours, after first being well mixed. I then draw it off into another barrel.

What I claim, and desire to secure by Letters Patent, is—

A new compound for a burning fluid, having as its base benzine or naphtha, fully charged with carbonic acid gas, so as to neutralize and partially destroy its inflammability, and the admixture thereafter of the several ingredients in the proportions named, as substantially set forth.

JAMES T. LEETE.

Witnesses:
C. V. WOODRUFF,
SAUNDERS A. BIGGS.